United States Patent [19]
Adler et al.

[11] Patent Number: 5,517,092
[45] Date of Patent: May 14, 1996

[54] ROTATION SPEED SENSING IN A DRIVE ARRANGEMENT FOR A MOTOR VEHICLE

[75] Inventors: Uwe Adler, Schweinfurt; Hans-Jürgen Drexl, Schonungen; Dieter Lutz, Schweinfurt; Franz Nagler, Ottendorf; Martin Ochs; Stefan Schiebold, both of Schweinfurt; Hans-Joachim Schmidt-Brücken, Geldersheim; Wolfgang Thieler, Hassfurt; Michael Wagner, Niederwerrn; Holger Westendorf, Hambach; Rainer Wychnanek, Madenhausen, all of Germany

[73] Assignee: Mannesmann Aktiengesellschaft, Düsseldorf, Germany

[21] Appl. No.: 211,654

[22] PCT Filed: Oct. 5, 1992

[86] PCT No.: PCT/DE92/00849

§ 371 Date: Jan. 8, 1994

§ 102(e) Date: Jan. 8, 1994

[87] PCT Pub. No.: WO94/07345

PCT Pub. Date: Mar. 31, 1994

[30] Foreign Application Priority Data

Oct. 10, 1991 [DE] Germany .................. 41 33 622.4

[51] Int. Cl.$^6$ ................................... H02P 1/54
[52] U.S. Cl. ............... 318/60; 318/86; 318/63; 318/53; 318/52
[58] Field of Search ............... 303/103, 99, 100, 303/91; 318/86, 63, 53, 52, 50, 60

[56] References Cited

U.S. PATENT DOCUMENTS

| | | | |
|---|---|---|---|
| 3,962,914 | 6/1976 | Lutz | 303/100 |
| 4,355,267 | 10/1982 | Franz, Jr. et al. | 318/86 |
| 4,363,999 | 12/1982 | Preikschat | 318/53 |
| 4,495,449 | 6/1985 | Black et al. | 318/63 |
| 5,043,898 | 8/1991 | Yoshino | 303/91 |
| 5,139,315 | 8/1992 | Walenty et al. | 303/103 |
| 5,234,262 | 8/1993 | Walenty et al. | 303/99 |

Primary Examiner—William M. Shoop, Jr.
Assistant Examiner—Karen Masih
Attorney, Agent, or Firm—Cohen, Pontani, Lieberman, Pavane

[57] ABSTRACT

In a drive arrangement of a motor vehicle in which the wheels of the motor vehicle are driven by separate electric motors and the electric motors are powered via a d.c. voltage intermediate circuit by a generator arrangement driven by an internal combustion engine, the speed of the internal combustion engine and individual wheels is sensed by speed sensing circuits which respond to pulse signals of commutator circuits of the generator arrangement and electric motors. The commutator circuits generate the pulse signals depending on position transmitters which are arranged at the generator arrangement and at the electric motors. In this way, the speeds can be sensed with great accuracy exclusively on the basis of already existing components of the drive arrangement. In particular, the speed sensing means cooperate with an antilock braking system (ABS) and a drive slip regulating system (ASR).

11 Claims, 1 Drawing Sheet

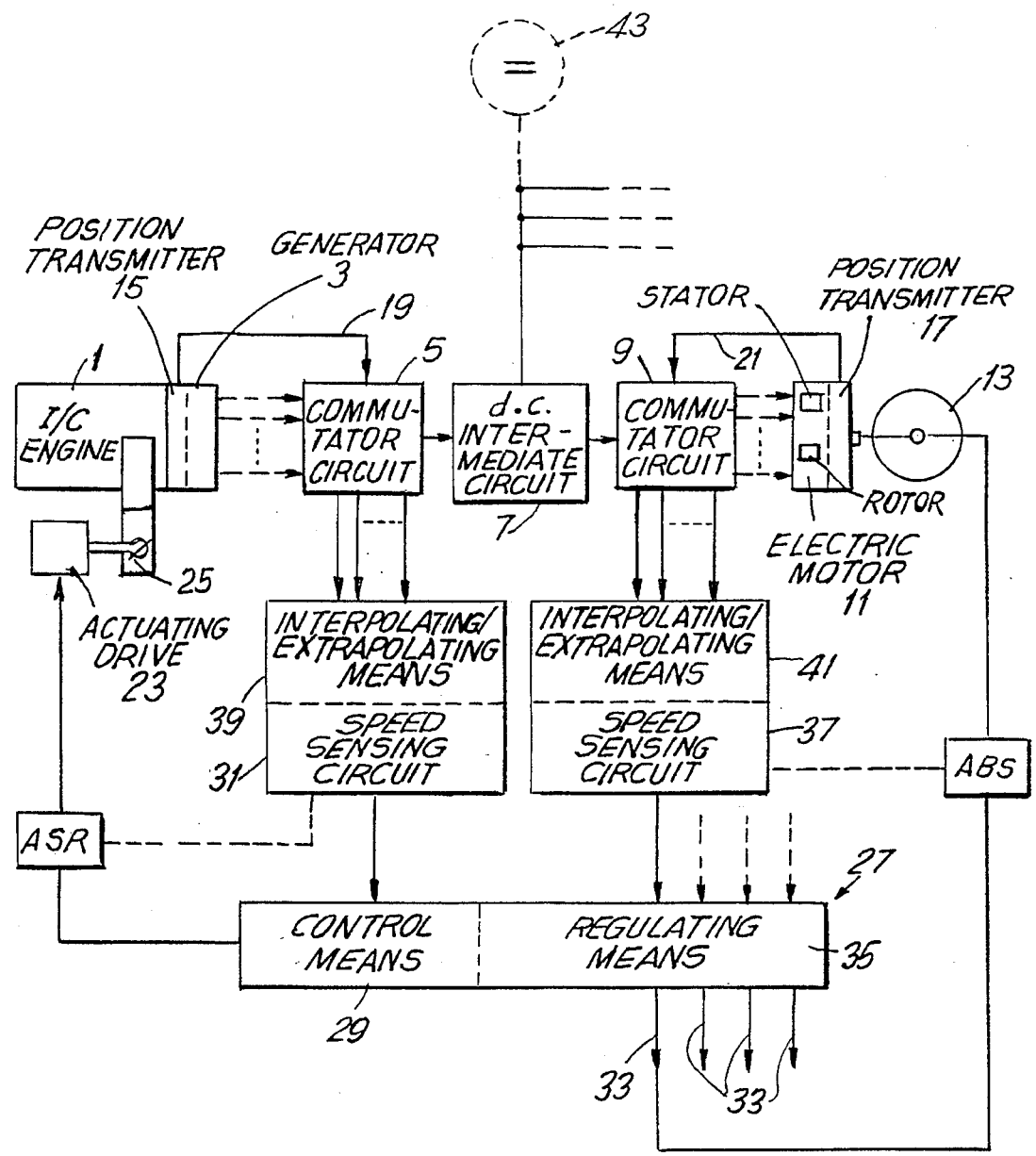

ROTATION SPEED SENSING IN A DRIVE ARRANGEMENT FOR A MOTOR VEHICLE

BACKGROUND OF THE INVENTION

The invention is directed to a drive arrangement for a motor vehicle and is concerned, in particular, with detecting the speeds of an internal combustion engine and the speeds of driving wheels of the motor vehicle.

In antilock braking systems (ABS) and drive slip regulating systems (ASR) of motor vehicles, the wheels must be detected very accurately. In conventional systems, speed sensors are arranged in the vicinity of the wheel bearings or special wheel bearings with integrated speed sensors are used. In either case, a comparatively high construction cost is required because the speed sensors must work under extreme operating conditions in the immediate area of the wheel. Similar considerations apply to conventional drive systems for accurate detection of the speed of the internal combustion engine, a knowledge of which is required for regulating and diagnosing the operation of the internal combustion engine.

In conventional drive arrangements for motor vehicles, the internal combustion engine drives the driving wheels via a mechanical transmission. It is known from the "VDI" Berichte No. 878, 191, pages 611 to 622, to couple a generator with the internal combustion engine of the motor vehicle in such a way that the generator is fixed with respect to rotation relative to the engine, while the driving wheels of the motor vehicle are connected with separate electric motors so as to be fixed with respect to rotation relative thereto, these electric motors being supplied with power by the generator arrangement via a d.c. voltage intermediate circuit. The generator arrangement and the electric motors of the known drive arrangement have a stator with a plurality of stator windings which are offset relative to one another in the circumferential direction and a rotor with a plurality of permanent magnets which are offset in the circumferential direction. The stator windings are connected to the d.c. voltage intermediate circuit via separate electronic commutator circuits associated with the generator arrangement and with the individual electric motors. To control the time sequence of currents in the individual stator windings, the commutator circuits generate pulse signals at timed intervals, which pulse signals trigger electronic switches, for example. Examples of such generators and electric motors are known from EP-A-0 159 005. Commutator circuits are described in EP-A-0 340 686.

SUMMARY OF THE INVENTION

In a drive arrangement of a motor vehicle with wheels driven by electric motors, the object of the invention is to indicate a way in which the speed of the driven wheels of the motor vehicle can be detected with great accuracy without additional sensors solely on the basis of the components already existing in the drive arrangement. More particularly, the drive arrangement should make do without additional sensors arranged in the immediate region of the wheel.

The invention is based on a drive arrangement for a motor vehicle having a plurality of electric motors which are coupled with separate driving wheels of the motor vehicle so as to be fixed with respect to rotation relative thereto and are powered via a d.c. voltage intermediate circuit by a generator arrangement coupled with an internal combustion engine so as to be fixed with respect to rotation relative thereto and/or by an energy storage, in particular an accumulator.

The electric motors have a stator with a plurality of stator windings which are offset relative to one another in the circumferential direction and a rotor with a plurality of permanent magnets which are offset relative to one another in the circumferential direction. The stator windings are connected to the d.c. voltage intermediate circuit via separate electronic commutator circuits which are associated with the individual electric motors and which generate pulse signals at timed intervals for controlling the time sequence of the currents passing through the stator windings. Moreover, each commutator circuit has a position transmitter which is arranged at the generator arrangement or at the electric motor and detects the relative position of the rotor with reference to the stator and controls the times at which the pulse signals are generated. A speed sensing circuit which responds to the pulse signals of the commutator circuit and generates a speed signal representing the speed of the driving wheel and/or a rotational angle signal representing the rotational angle of the driving wheel is connected to the commutator circuit of at least one of the electric motors.

The invention is based on the idea that the pulse signals generated by the commutator circuit on the basis of position transmitters already contain highly accurate information concerning the relative angular position of the rotor and stator so that by measuring the repetition rate of the pulse signals, e.g. by counting the pulse signals per unit of time, the speed can be detected in a simple and very accurate manner. Since electric motors and generator arrangements of the type in question generally have a comparatively large number of poles and accordingly stator windings and permanent magnets, changes in speed can be detected within a fraction of a single revolution. The position transmitter forms a unit with the generator arrangement and electric motor and can thus be encapsulated with its stator. There is no need for sensors such as were previously arranged at the wheels or, e.g., in the region of the toothed flywheel ring of the starter for detecting engine speed.

Drive slip regulating systems (ASR) and antilock braking systems (ABS) must always be fully operational even at relatively low vehicle speeds at which fewer pulse signals occur per time segment corresponding to the comparatively low engine speeds. Therefore, in certain critical driving situations the pulse signals actually detected may not be sufficient for a fast response.

For this reason, the speed sensing circuit according to the invention has calculating means, in particular interpolating means and/or extrapolating means which calculate additional values of the speed signal or rotational angle signal depending on the signal reinforcement or supporting values determined by means of the pulse signals. In a corresponding embodiment which can be realized, for example, by dividing or multiplying the pulse rate by a factor depending on the rate of change of the repetition rate, as the case may be, the accuracy of the speed signal can be substantially increased, particularly at lower vehicle speeds. Because of the high accuracy with which the speed signal can be generated, the invention is preferably used in such a way that the antilock braking system and/or the drive slip regulating system monitors or monitor the rate of change of the speed signal and can be activated when the rate of change of the speed signal of one of the speed sensing circuits exceeds a given limiting value. Whereas the speed difference between two wheels is monitored in conventional activating criteria for detecting a wheel slippage state, the construction according to the invention is based on the idea that a sudden change in speed of a driven wheel can be attributed to a loss of wheel grip, in other words the grip limit of the wheel is exceeded. The antilock braking system and/or drive slip regulating system is/are activated when the rate of change of the speed signal exceeds a given limiting value and the system advisably detects the magnitude of the change in speed per time clock interval for this purpose.

In a preferred construction, the drive slip regulating system is subordinated to the antilock braking system and, based on the principle of a continuous regulation of slippage, has regulating means which adjust the wheel slippage to a given limiting value. In this way, the drive slip regulating system already limits the driving torque depending on slippage before locking so as also to reduce the slippage which is to be reduced by the antilock braking system by proportioning the braking torque. The drive slip regulating system can adjust slippage, for example, on the basis of a regulating principle using "fuzzy logic".

BRIEF DESCRIPTION OF THE DRAWING

In the following, an embodiment example of the invention is explained in more detail with reference to a drawing. The drawing shows a block diagram of a drive arrangement for a motor vehicle according to the invention.

DETAILED DESCRIPTION OF THE PREFERRED EMBODIMENTS

The drive arrangement has an internal combustion engine 1 which directly drives a generator arrangement 3 flanged to the internal combustion engine 1. The generator arrangement 3 supplies power to a d.c. intermediate circuit 7 via an electronic commutator circuit 5. A plurality of electric motors 11, each of which drives one of the wheels 13 of the motor vehicle, are connected to the d.c. intermediate circuit 7 via electronic commutator circuits 9 associated with the motors 11. The drawing shows only one of the wheels 13 with the electric motor 11 which is connected with it so as to be fixed with respect to rotation relative thereto and with the associated commutator circuit 9.

The generator arrangement 3 and every electric motor 11 contains a multipolar stator, not shown in more detail, with a plurality of (e.g., 18) separate stator windings and a rotor, also not shown, with a plurality of permanent magnets. An example of such a generator and electric motor is described in EP-A-0 159 005. Both the generator arrangement 3 and each electric motor 11 contains a position transmitter 15, 17, respectively, which senses the instantaneous angular position of the rotor relative to the stator and transmits angular position signals to the associated commutator control 5, 9, respectively, via lines 19, 21, respectively. The commutator controls 5, 9 contain electronic switches which are associated with the individual stator windings and which turn on and turn off currents flowing into the stator windings at timed intervals depending on the angular position signals of the position transmitter 15, 17 in the sequence determined by the winding arrangement For this purpose, the commutator circuits 5, 9 generate a plurality of pulse signals for controlling the switches associated with the individual stator windings. An example of such a commutator circuit is described in EP-A-0 340 686.

The drive arrangement has a control unit 27, e.g. a microprocessor or the like, which controls the output of the internal combustion engine 1 via an actuating drive 23 of an output adjusting element 25, e.g. a throttle valve or injection pump. The control unit 27 has conventional means 29 for controlling the performance characteristics of the internal combustion engine 1 depending on a speed signal supplied by a speed sensing circuit 31 and representing the speed of the internal combustion engine 1. The control unit 27 further comprises regulating means of a drive slip regulating system (ASR) which limits the driving torque of the slipping wheel or wheels in a manner not described at greater length either via the output regulating means of the internal combustion engine 1 or via the electrical power generated by the generator arrangement 3 or via the electrical power supplied to the electric motors 11. The control unit 27 further contains regulating means of an antilock braking system (ABS) which controls the braking torque acting on the wheels 13 via control outputs 33. The regulating means for these systems indicated in the drawing at 35 respond, separately for each wheel, to speed signals which are supplied by separate speed sensing circuits 37, only one of which is shown in the drawing.

The speed sensing circuits 31, 37 respond to the pulse signals generated by the commutator circuits 5, 9 depending on the times determined by the position transmitters 15, 17 and determine the speed signal supplied to the control unit 27 based on the repetition rate of the pulse signals. Accordingly, additional speed sensors which directly detect the speed of the internal combustion engine 1 and wheels 13 are unnecessary. The speed sensing circuits 31, 37 which can form a component part of the control unit 27 contain additional means 39 and 41, respectively, for interpolating or extrapolating additional speed signal values depending on supporting values of the signal curve determined by the pulse signals of the commutator circuits 5, 9. In their simplest form, the interpolating or extrapolating means can be formed by pulse rate multiplier circuits or pulse rate divider circuits which multiply or divide the repetition rate of the pulse signals by a given factor. In order to increase accuracy also when the speed signals change over time, this factor advisably depends on the rate of change of the speed signal determined by the supporting values.

The regulating means 35 detect an "overview" of the instantaneous transmission of the wheel 13 on the road surface depending on each individual speed signal. If the rate of change of the wheel revolutions exceeds a predetermined limiting value, this is interpreted as meaning that the wheel grip limit has been reached and is made use of during a drive phase for activating the drive slip control or during a braking phase for activating the antilock braking. The drive slip regulating system works on the principle of a continuous adjustment of slippage and maintains slippage at a given limit within a determined slip range. The use of fuzzy logic is suitable for regulating the drive slip. This corresponds to a simulation of a variable coefficient of friction or to imparting a variable roughness of the road surface to the regulating system. The drive slip regulating system which continuously adjusts to the slippage limit anticipates the antilock braking system and prevents an excessive increase in slippage before the locking of the wheel when braking, i.e. it allows a better proportioning of the braking torque.

Of course, the speed sensing circuits 31, 37 can also be used to determine the rotational angle and can accordingly supply the control unit 27 with rotational angle signals.

A variant of the drive arrangement in which electrical power is supplied to the d.c. voltage intermediate circuit 7 from an energy storage 43 constructed as an accumulator or battery is shown in dashed lines in the drawing. The energy storage 43 can be provided in addition to the generator arrangement 3 so that the electric motors 13 can be supplied with power optionally from the generator arrangement 3 or from the energy storage 43. Alternatively, the internal combustion engine 1 and generator arrangement 3 can be dispensed with.

We claim:

1. A drive arrangement for a motor vehicle, comprising: electric motors coupled to separate driving wheels of the motor vehicle so as to be rotatably fixed thereto, the electric motors each having a stator with a plurality of stator windings that are offset relative to one another in a circumferential direction and a rotor with a plurality of permanent magnets that are offset relative to one another in the circumferential direction; energy supply means for powering the electric motor; D.C. voltage intermediate circuit means for connecting the electric motors to the energy supply means; a plurality of electronic commutator circuits operatively associated with the individual electric motors for connecting the stator windings with the D.C. voltage intermediate circuit means, the electronic commutator circuits including means for generating pulse signals at timed intervals for controlling time sequencing of currents in the stator windings; a plurality of position transmitters, one position transmitter being arranged at each of the electric motors and operatively connected to one of the commutator circuits for detecting a position of the rotor relative to the stator and for transmitting corresponding position data to the commutator circuit to control times at which the pulse signals are generated; speed sensing circuit means responsive to the pulse signals of the commutator circuit of at least one of the electric motors for generating a value of at least one of a speed signal that represents driving wheel speed and a rotational angle signal that represents the rotational angle of the driving wheel, the speed sensing circuit means including means for determining signal supporting values from a curve formed by the pulse signals of the commutator circuits, and calculating means for calculating additional values of one of the speed signal and the rotational angle signal based on the signal supporting values; and at least one of an antilock braking system and a drive slip regulating system, the speed sensing circuit means being connected to at least one of the antilock braking system and the drive slip regulating system.

2. A drive arrangement according to claim 1, wherein the energy supply means includes a generator arrangement operatively coupled with an internal combustion engine so as to be rotatably fixed relative thereto.

3. A drive arrangement according to claim 1, wherein said energy supply means includes an energy storage device.

4. A drive arrangement according to claim 3, wherein the energy storage device is an accumulator.

5. A drive arrangement according to claim 1, wherein the calculating means includes at least one of interpolating means and extrapolating means.

6. A drive arrangement according to claim 1, wherein the antilock braking system is operative to determine a rate of change of the speed signal and to activate a braking operation when the rate of change of the speed signal of the speed sensing circuit means exceeds a given limiting value stored in the antilock braking system.

7. A drive arrangement according to claim 6, wherein the driving wheels are connected to the antilock braking system, the antilock braking system being operative to detect a magnitude of the change in speed per clock time interval.

8. A drive arrangement according to claim 1, wherein the drive slip regulating system includes regulating means for adjusting wheel slippage to a predetermined limiting value of slippage.

9. A drive arrangement according to claim 1, wherein the drive slip regulating system is operatively arranged to monitor a rate of change of the speed signal and so as to activate when the rate of change of the speed sensing circuit means exceeds a given limiting value.

10. A drive arrangement according to claim 9, wherein the driving wheels are connected to the drive slip regulating system, the drive slip regulating system being operative to detect a magnitude of the change in speed per clock time interval.

11. A drive arrangement according to claim 1, wherein the driving wheels are connected to the antilock braking system and the drive slip regulating system, the antilock braking system and the drive slip regulating system detecting a magnitude of the change in speed per clock time interval.

* * * * *